US011014467B2

(12) United States Patent
Salem

(10) Patent No.: US 11,014,467 B2
(45) Date of Patent: May 25, 2021

(54) SELF CHARGING LIGHTWEIGHT DRONE APPARATUS

(71) Applicant: Mores, Inc., Burbank, CA (US)

(72) Inventor: Ayman Salem, Burbank, CA (US)

(73) Assignee: Mores, Inc., Burbank, CA (US)

( * ) Notice: Subject to any disclaimer, the term of this patent is extended or adjusted under 35 U.S.C. 154(b) by 0 days.

(21) Appl. No.: 16/578,133

(22) Filed: Sep. 20, 2019

(65) Prior Publication Data

US 2020/0143718 A1 May 7, 2020

Related U.S. Application Data

(63) Continuation of application No. 15/162,381, filed on May 23, 2016, now Pat. No. 10,424,231.

(Continued)

(51) Int. Cl.
*B60L 53/68* (2019.01)
*G09F 21/12* (2006.01)
(Continued)

(52) U.S. Cl.
CPC ............ *B60L 53/68* (2019.02); *B64B 1/58* (2013.01); *B64C 39/024* (2013.01); *G05D 1/104* (2013.01); *G09F 21/12* (2013.01); *B60L 2200/10* (2013.01); *B64C 2201/027* (2013.01); *B64C 2201/042* (2013.01); *B64C 2201/101* (2013.01); *B64C 2201/108* (2013.01); *B64C 2201/12* (2013.01); *B64C 2201/128* (2013.01); *B64C 2201/143* (2013.01); *Y02T 10/7072* (2013.01);

(Continued)

(58) Field of Classification Search
CPC .......... G09F 21/12; B64C 39/024; B64B 1/62
See application file for complete search history.

(56) References Cited

U.S. PATENT DOCUMENTS

| 2005/0236519 | A1* | 10/2005 | Handley | ............... B64B 1/06 244/97 |
| 2012/0056041 | A1* | 3/2012 | Rhee | .................. B64C 25/32 244/4 R |

(Continued)

OTHER PUBLICATIONS

"Are Drones the Future of Advertising?" www.davidcarson.info, Dec. 2, 2014. (Year: 2014).*

(Continued)

*Primary Examiner* — Gary C Hoge
(74) *Attorney, Agent, or Firm* — Smyrski Law Group, A P.C.

(57) ABSTRACT

A drone apparatus or arrangement is provided. The drone apparatus or arrangement includes a plurality of drone devices, each drone device including an unmanned vehicle configured to be controlled to hover in air at a desired height and move to a desired location, each drone device comprising a rechargeable battery connected to an exposed drone recharging surface, and a surface apparatus connected to the plurality of drone devices such that the plurality of drone devices are collectively controllable to reposition the surface apparatus to a desired location. Each drone device is configured to connect to and recharge at a compatible charging station including an exposed recharging station recharging surface configured to meet with one exposed drone recharging surface to recharge the rechargeable battery.

19 Claims, 13 Drawing Sheets

Related U.S. Application Data

(60) Provisional application No. 62/166,629, filed on May 26, 2015.

(51) Int. Cl.
*B64C 39/02* (2006.01)
*G05D 1/10* (2006.01)
*B64B 1/58* (2006.01)

(52) U.S. Cl.
CPC .............. *Y02T 90/12* (2013.01); *Y02T 90/14* (2013.01); *Y02T 90/16* (2013.01)

(56) References Cited

U.S. PATENT DOCUMENTS

| | | | | |
|---|---|---|---|---|
| 2012/0273608 A1* | 11/2012 | Jess | ............. | B64B 1/08 |
| | | | | 244/26 |
| 2015/0035437 A1* | 2/2015 | Panopoulos | ........... | H05B 47/19 |
| | | | | 315/112 |
| 2015/0162867 A1* | 6/2015 | Meringer | ............. | H02S 20/20 |
| | | | | 362/183 |
| 2015/0183528 A1* | 7/2015 | Walsh | ............. | B64F 1/32 |
| | | | | 701/3 |

OTHER PUBLICATIONS

"Opinion Poll," JDA Journal, Nov. 19, 2015 (Year: 2015).*
"For One Student, Dreams of Drone-Based Advertising Take Flight," Fortune, Aug. 27, 2014 (Year: 2014).*

* cited by examiner

SELF CHARGING LIGHTWEIGHT DRONE APPARATUS

The present application is a continuation of co-pending U.S. patent application Ser. No. 15/162,381, entitled "Self Charging Lightweight Drone Apparatus," inventor Ayman Salem, filed May 23, 2016, which claims priority based on U.S. Provisional Patent Application Ser. No. 62/166,629, entitled "Self Charging Lightweight Drone Apparatus," inventor Ayman Salem, filed May 25, 2015, which are both incorporated herein by reference in their entireties.

BACKGROUND OF THE INVENTION

Field of the Invention

The present invention relates in general to aerodynamic devices, and more specifically a drone arrangement selectively including sensors, controls, and a display surface in order to accurately maneuver and dynamically position the display surface for shading or advertising purposes.

Description of the Related Art

Ongoing needs exist for lightweight and readily deployable devices that can accomplish certain everyday goals. One such goal is advertising to a target consumer or group of consumers, while a second goal is providing cover or shading.

With respect to advertising, the need for dynamic and interesting advertising remains ongoing. As people become more sophisticated, more is required to draw their attention to advertising. Current advertising comes in many forms, including television advertising, radio advertising, static or dynamic billboards or facades, smartphone or device based advertising, handouts and pamphlets, advertising within television shows or movies, banners pulled behind airplanes, labeling in stadiums and on sports uniforms, and so forth. Much of this type of advertising is limited and not captivating; for example, many forms of advertising require a user to direct her attention to the ad while she may be doing something else. Certain other forms of advertising can be costly, requiring rental of time or space.

What could be particularly beneficial in these situations is a type or form of advertising that is relatively inexpensive, dynamic, and has the ability to quickly capture the attention of the target audience.

Similarly, certain needs arise in daily life relating to shading, i.e. blocking of sunlight, blocking of rain or dust, or alternately blocking views of persons or devices.

Persons may be in a location where they desire shade, but an umbrella, hat, or other shading device is unavailable or unacceptable. Persons may also wish to protect themselves from rain, dust, or other windblown matter. Further, persons may on occasion wish to block certain items or events from viewing by people or devices such as cameras. Persons in such situations are forced to either relocate or endure sunlight, rain, or other elements, or must decide whether to allow others to possibly view acts or personal items they would rather keep private. In these situations, lightweight and readily deployable devices are largely unavailable.

It would be highly beneficial if lightweight readily deployable devices could be provided that include advertising or offer shading and/or visual obstruction, wherein such devices overcome issues associated with previous devices.

SUMMARY OF THE INVENTION

Thus according to one aspect of the present design, there is provided an apparatus comprising a plurality of drone devices, each drone device comprising an unmanned vehicle configured to be controlled to hover in air at a desired height and move to a desired location, each drone device comprising a rechargeable battery connected to an exposed drone recharging surface, and a surface apparatus connected to the plurality of drone devices such that the plurality of drone devices are collectively controllable to reposition the surface apparatus to a desired location. Each drone device is configured to connect to and recharge at a compatible charging station comprising an exposed recharging station recharging surface configured to meet with one exposed drone recharging surface to recharge the rechargeable battery.

According to another aspect of the present design, there is provided a drone device arrangement comprising at least one drone device comprising an unmanned vehicle configured to be controlled to hover in air at a desired height and move to a desired location, with at least one drone device comprising a rechargeable battery connected to an exposed drone recharging surface, and a surface apparatus configured to contain a fluid that is lighter than air, the display surface connected to the at least one drone device. Each drone device is configured to connect to and recharge at a compatible charging station comprising an exposed recharging station recharging surface configured to meet with one exposed drone recharging surface to recharge the rechargeable battery.

According to a further aspect of the present design, there is provided a rechargeable drone arrangement comprising a plurality of drone devices configured to be controlled to hover in air at a desired height and move to a desired location, and a surface apparatus comprising graphical information and a lighter than air fluid, the surface apparatus connected to the plurality of drone devices such that the plurality of drone devices are collectively controllable to reposition the surface apparatus to a desired location. Each drone device comprises an exposed drone recharging surface configured to receive charge and recharge a drone rechargeable battery in one drone device, wherein each drone device is configured to recharge at a compatible charging station comprising an exposed recharging station recharging surface that meets with one exposed drone recharging surface to recharge one drone rechargeable battery.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

Figure 1:
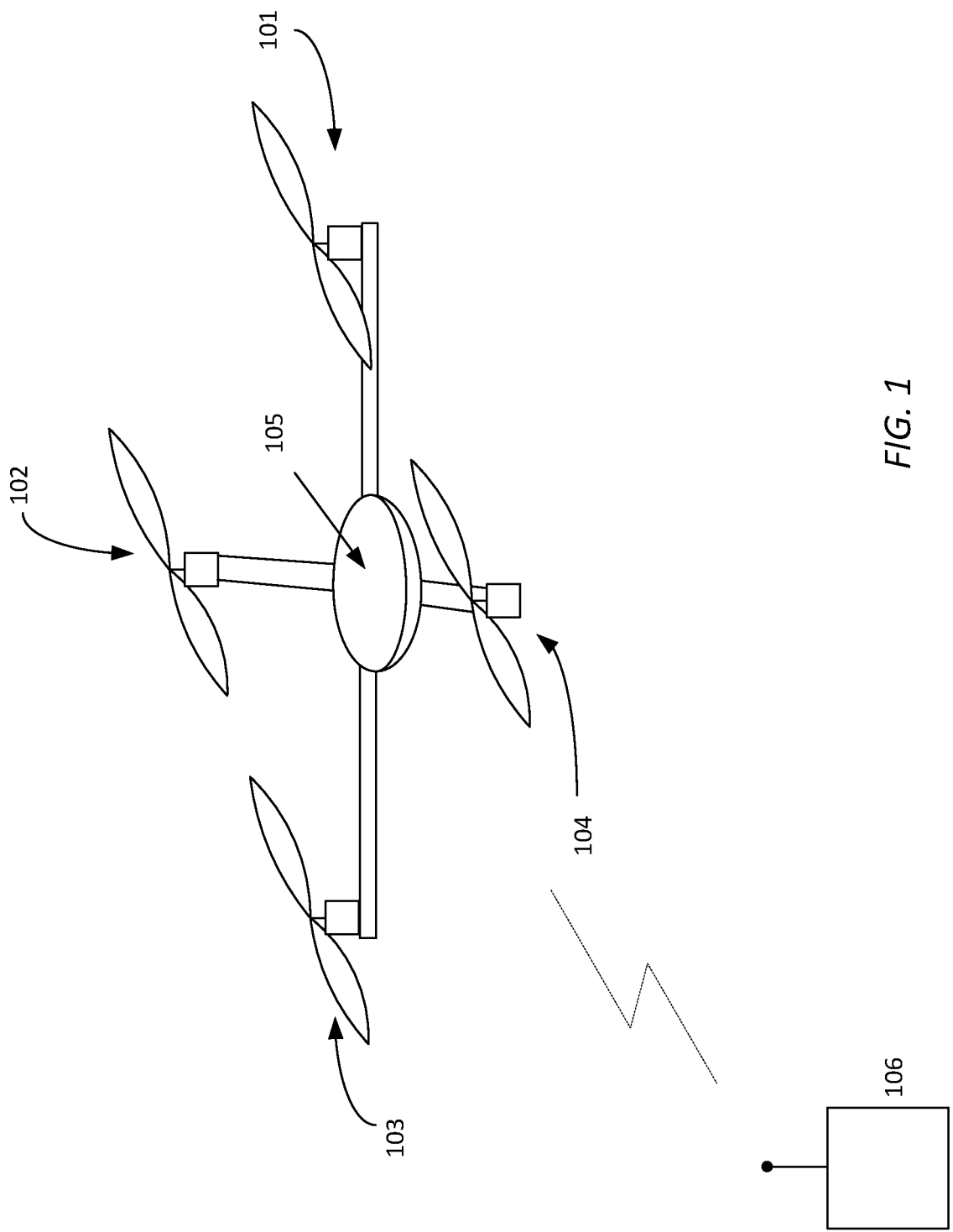
FIG. 1 is one type of drone or micro drone usable in the present design.

The exemplification set out herein illustrates particular embodiments, and such exemplification is not intended to be construed as limiting in any manner.

DETAILED DESCRIPTION OF THE INVENTION

The following description and the drawings illustrate specific embodiments sufficiently to enable those skilled in the art to practice the system and method described. Other embodiments may incorporate structural, logical, process and other changes. Examples merely typify possible variations. Individual components and functions are generally optional unless explicitly required, and the sequence of operations may vary. Portions and features of some embodiments may be included in or substituted for those of others.

In general, the present invention includes a lightweight drone device arrangement, in one instance including two or four drones, each attached to a part, such as a corner, of a lightweight apparatus. The lightweight apparatus may be a lighter than air filled inflatable apparatus, e.g. balloon, or in one embodiment, simply a sheet or other lightweight surface or device. Graphic images may be provided on or with the lightweight apparatus, such as on the surface of a helium filled balloon, and images may be projected on or two the lightweight apparatus.

In essence, the present design comprises a lightweight surface, preferably an enclosure or balloon type device filled with a gas that is lighter than air, such as helium or hydrogen or other appropriate gas, and the lightweight surface is provided with hovering mechanisms, such as drones, where the drones in essence guide the lightweight surface to a desired location, rather than carry or pull or otherwise force the lightweight surface to a desired location. The arrangement may achieve buoyancy or equilibrium or near-buoyancy conditions that can be corrected by the software and the drones or micro drones.

Alternately, the present design may include a lightweight receptacle or pouch wrapped around a rotor of different sizes so the encasement is generally safe for indoor use or light outdoor use if people or pets are present. Lift is achieved to assist a state of equilibrium in hovering, or "laminar hovering" wherein laminar flow makes the device sleek and less noisy.

The purpose of this arrangement is to gather data, transmit data, provide interactive communications, social media, surveillance, carry samples, provide indoor and outdoor delivery, employ thrust in certain arrangements to avoid critical situations encountered during operations, advertisement, physical shading, 2D and/or 3D panoramic and holographic recording and display, carrier/encasement of smart reflective or interactive surface (which can be anything from a poster to a television sceen), deployed by paramedics to communicate with an individual who, for example, fell off of a cliff to assess injuries and communicate with that person, as well as the display of merchandise. The device is self-charging and may acquire energy from an energy source such as the sun or a charging station. The device may be manually positioned on and/or flown, i.e. directed to, a charging station. Firing of rotors may be in parallel or in series, and indoor and outdoor autopilot navigation may be provided.

The lightweight drone device arrangement may include a sensor or sensors provided with one or more of the drones, and the lightweight drones may be provided with recharge capability via a charging station or stations. When sensors are employed, such as a camera or cameras, the arrangement can be repositioned to take advantage of a certain situation, such as positioning close to a target even when the target is moving. Alternately, the device may be constantly moving and the design may include reference elements, statically or dynamically positioned, where the device may sense the presence of a reference element and may move toward or away from the reference element or follow the reference element. In this manner, the apparatus may move or circle about an area continuously or may pass back and forth on a determined path within a given area.

Alternately, the present design may include a lightweight element, comprising either an inflatable surface or a noninflatable surface, that can block the sun or otherwise block a certain area. The design may in some instances include supplemental power capability, such as a controllable thrust arrangement, wherein thrust is released at desired times to propel the apparatus in a desired direction, including away from the ground.

Drones are devices that can be flown without a pilot and have been used extensively in military and more recently in civilian activities. Micro drones are small versions of drones, typically controllable by a user or a controller from a distance. Different types of drones and micro drones are available, and certain such micro drones may include different arrangements, numbers of propellers and/or propelling sources, and may vary in size. However, due to the requirements of a micro drone in the Earth's atmosphere, such devices must be relatively light and their propellant sources relatively powerful.

The present disclosure uses the term "drone arrangement" to mean a collection of one or more drones or micro drones, and use of the word "drone" or "micro drone" or "drone arrangement" is intended broadly. The terms "drone" and "micro drone" as used herein mean any type of hovering unmanned propelled device irrespective of size and the terms may be used interchangeably. The term "drone arrangement" is generally employed to cover any of the designs suggested herein or any similar type of device, apparatus, system, or arrangement.

A drawing of one type of drone or micro drone is presented in FIG. 1. From FIG. 1, the micro drone 100 includes four upward facing propellers 101-104 that rotate and provide lift, and the propellers 101-104 are electrically connected to a central controller 105 positioned in the center of the micro drone 100. A remote device 106 is typically provided that can provide commands, such as increase lift, decrease lift in order to hover, or move in a given direction.

The central controller 105 may include a printed circuit board or other electronics configured to provide control to the micro drone 100, as well as a power source and a receiver configured to receive signals from a remote transmitter within remote device 106. In normal operation, a user may move control switches or devices on the remote device 106, which are converted to electronic commands and transmitted to the receiver on the micro drone 100, which converts the signals received into electronic commands provided to internal electronics that command at least one and as many as all of the propellers to increase or decrease speed. In certain micro drones or drones, an ability to move the axis of rotation of an individual propeller may also be provided and controlled or commanded. Micro drones providing such control ability are commercially available, and any such micro drone or drone, or even a simple hovering and controllable engine, may be employed with the lightweight surface that provides an ability to be controlled to fly in a desired path or course and provide the additional functionality described herein.

While shown with four propellers in FIG. 1, the micro drone may be any sized drone or hovering device and may include any reasonable number of propellers or devices that provide thrust, e.g. aerodynamic thrust, in a fluid such as air, including fewer than four propellers or thrust providing devices or more than four such propellers or thrust providing devices. In essence, any device that can hover, move, and be controlled and can support its weight and additional weight may be employed. Such a device or devices are generically referred to as "drones" or "micro drones" herein, and those terms are intended broadly to include unmanned hovering devices of any shape or form.

The remote device 106 may include different control elements, such as a multi-position switch that allows for sliding right and left and articulating forward and backward. Such controllers and controller switches or control buttons are common in remote control devices such as drones and remote control cars. In the case of drones and micro drones, the buttons may be employed to control throttle, banking, trim, movement direction (left, right, forward, back, up, down, and/or various modes of flight. Movement of the buttons and switches provides control over the drone or micro drone.

Figure 2A:
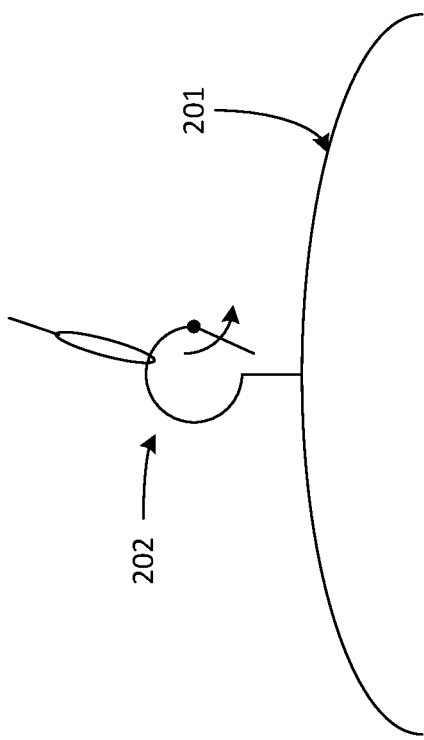
FIGS. 2A and 2B illustrate two possible additions to a drone or micro drone in accordance with the present design.
Figure 2B:
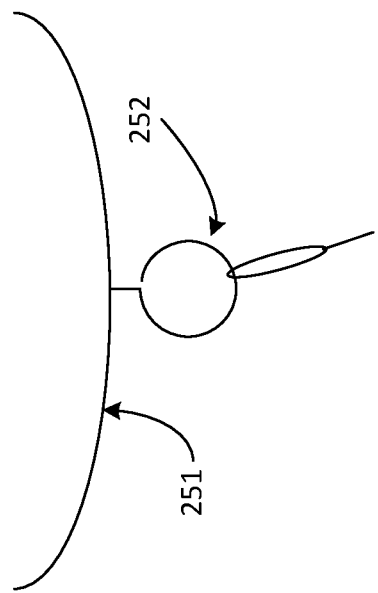

FIGS. 2A and 2B illustrate two possible additions to a drone or micro drone in accordance with the present design. Element 201 represents a bottom surface of a micro drone in this example and includes a hook type device 202 configured to receive any type of loop or opening, such as an opening for a lightweight fabric or lightweight apparatus or surface. FIG. 2B shows the top surface 251 of a drone and a hook type device 252. Such a hook type device (ring, receptacle, attachment means) can be provided anywhere that is appropriate on the drone or micro drone, and may include any other type of attachment device reasonable to perform the functionality called for herein, such as providing sufficient lift and either guiding or carrying ability for a lightweight surface, such as an inflatable surface, as well as an ability to receive and carry or otherwise support a lightweight element such as a shade, cover, or advertising element. A snap, opening, or other receiving device may be employed with the drone or micro drone. Different drones may provide different receiving devices and more than one receiving device may be provided on a micro drone or drone, but in all cases the drone or micro drone offers an ability to attach a lightweight device or apparatus such as the lightweight device or apparatus discussed herein.

Figure 3A:
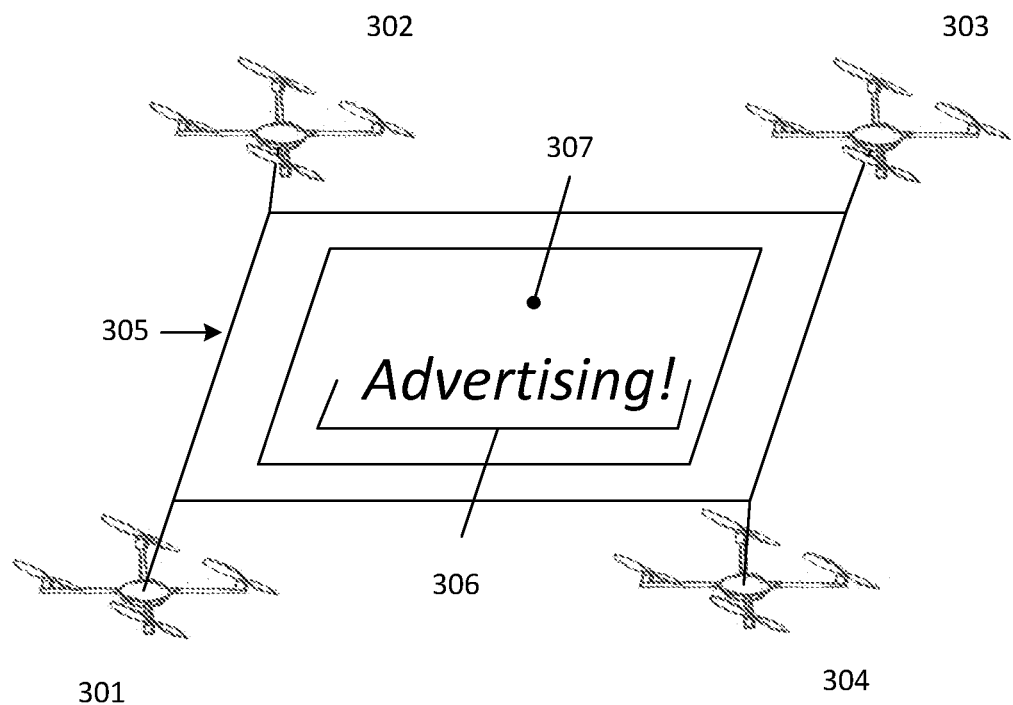
FIG. 3A shows an alternate representation of the present design, with four micro drones provided together with a lightweight surface.

FIG. 3A shows an alternate representation of the present design, with four micro drones 301-304 provided in this representation, together with a lightweight surface 305. The lightweight surface 305 may be a light polymer or plastic or even paper or a microfiber surface. Alternately, lightweight surface 305 may be an inflatable surface, effectively a large, flat balloon, filled with a fluid that may be lighter than air, such as helium or hydrogen. Advertising or graphic information may be provided on a side of lightweight surface 305, shown as advertising 306 on side 307 in FIG. 3A. Graphic information may be projected onto lightweight surface 305, either externally, from an external projector, or internally, such as via an OLED arrangement or a projector and magnification system. Internal projection may be directed by the drone arrangement to the screen or surface, potentially using an on-board projector arrangement and a series of lenses or other magnification elements to project onto or behind the screen such that the projected image or images can be viewed.

Drones 301-304 may be independent, or free floating but remotely controllable and controlled, or may be connected by a physical apparatus, such as plastic poles, but use of such rigid connections can affect aerodynamics. The four drones 301-304 may be independently controlled or jointly controlled. If independently controlled, four sets of controls may be needed. If jointly controlled, a controller is provided that allows for a uniform set of controls with transmissions to each drone accordingly, i.e. a command to move forward is transmitted to all four at once. A command to move down is also uniformly transmitted. Because of latency and differences in performance due to atmospheric differences, such control may require sophisticated interpretation by software and/or hardware either at the control unit or at the drone, or both. For example, if the command is to move to the right and one of the drones is oriented in a tilted orientation while all others are parallel with the ground. A command to move forward may be transmitted by the controller and its transmitter to all four drones, and the drone oriented in the tilted orientation may need to process the command to move forward as a command to move forward based on the existing orientation, and may effectuate propeller movement that causes the drone to move forward based on its current orientation. In other words, a command received by a drone may be translated into a command for the particular thrust mechanisms of the drone to move in the desired orientation abased on present orientation.

Figure 3B:
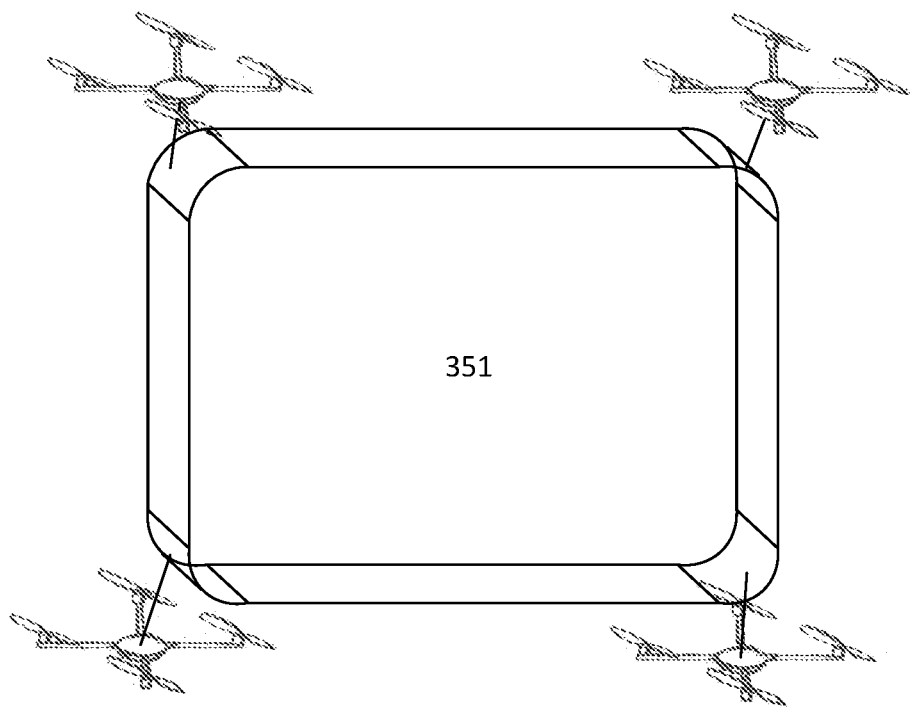
FIG. 3B is another representation of the present design with a lightweight surface that is essentially a balloon, in one instance containing a gas that is lighter than air.

While four drones are shown in FIG. 3A, it may be appreciated that different numbers of drones or micro drones may be employed, such as two micro drones positioned on top of the lightweight surface. FIG. 3B shows the four drones or microdrones together with a surface, again a lightweight surface such as an inflatable element containing a gas that is lighter than air, where the drones or micro drones merely guide the slightweight surface and do not necessarily carry, pull, or otherwise force the lightweight surface to a desired position.

Figure 4:
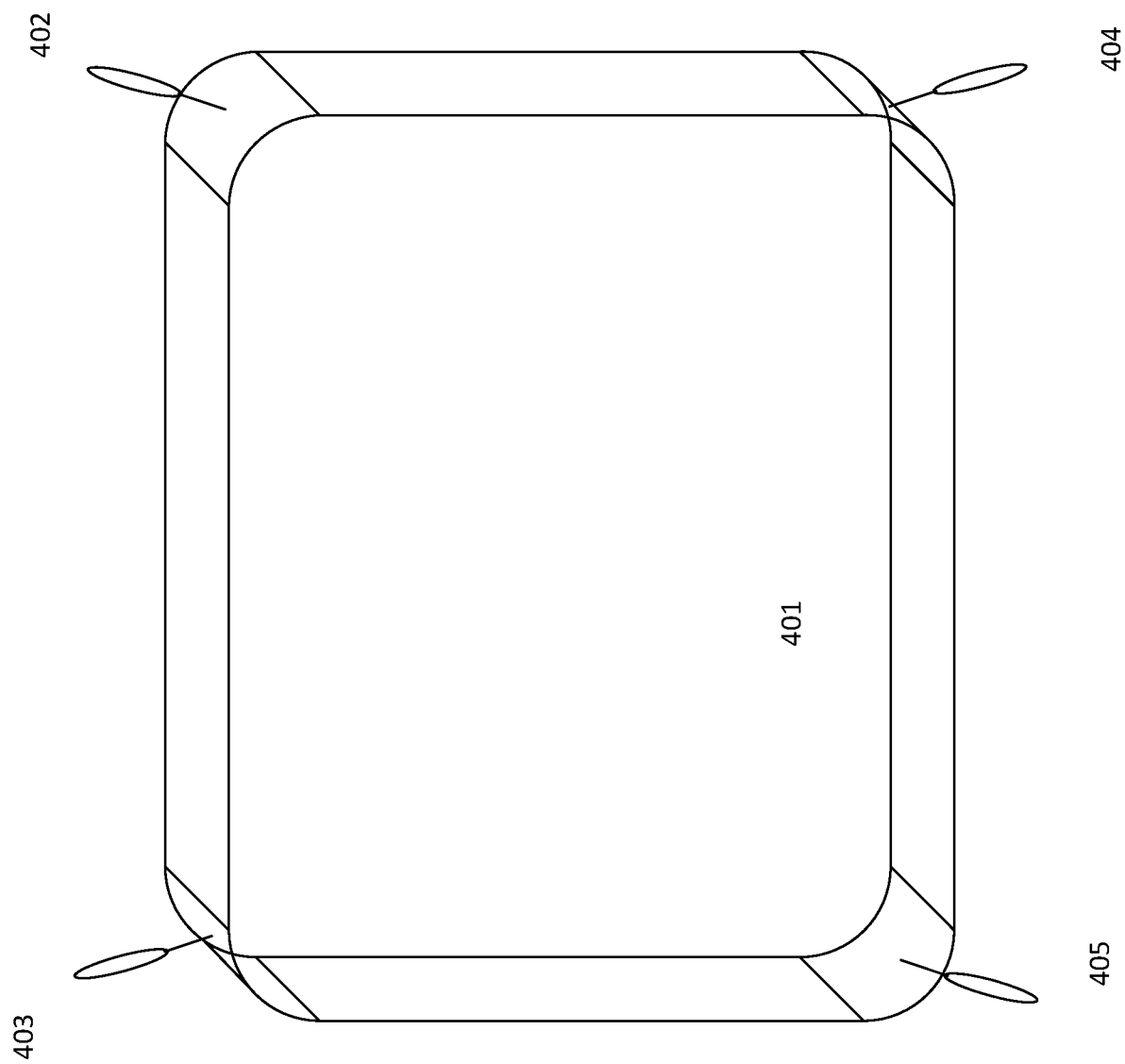
FIG. 4 represents one embodiment of a lightweight surface without drones attached.

FIG. 4 represents one embodiment of a lightweight surface without drones attached. In this representation, the lightweight surface is an inflated surface 401 having a generally rectangular shape with rounded edges, and four loops provided 402-405, one at each corner. In this embodiment, the inflated surface may be inflated with air, but lighter than air gases are preferable, such as helium or hydrogen. At least two and possibly all four of the loops 402-405 may be attached to a drone or micro drone.

Figure 5:
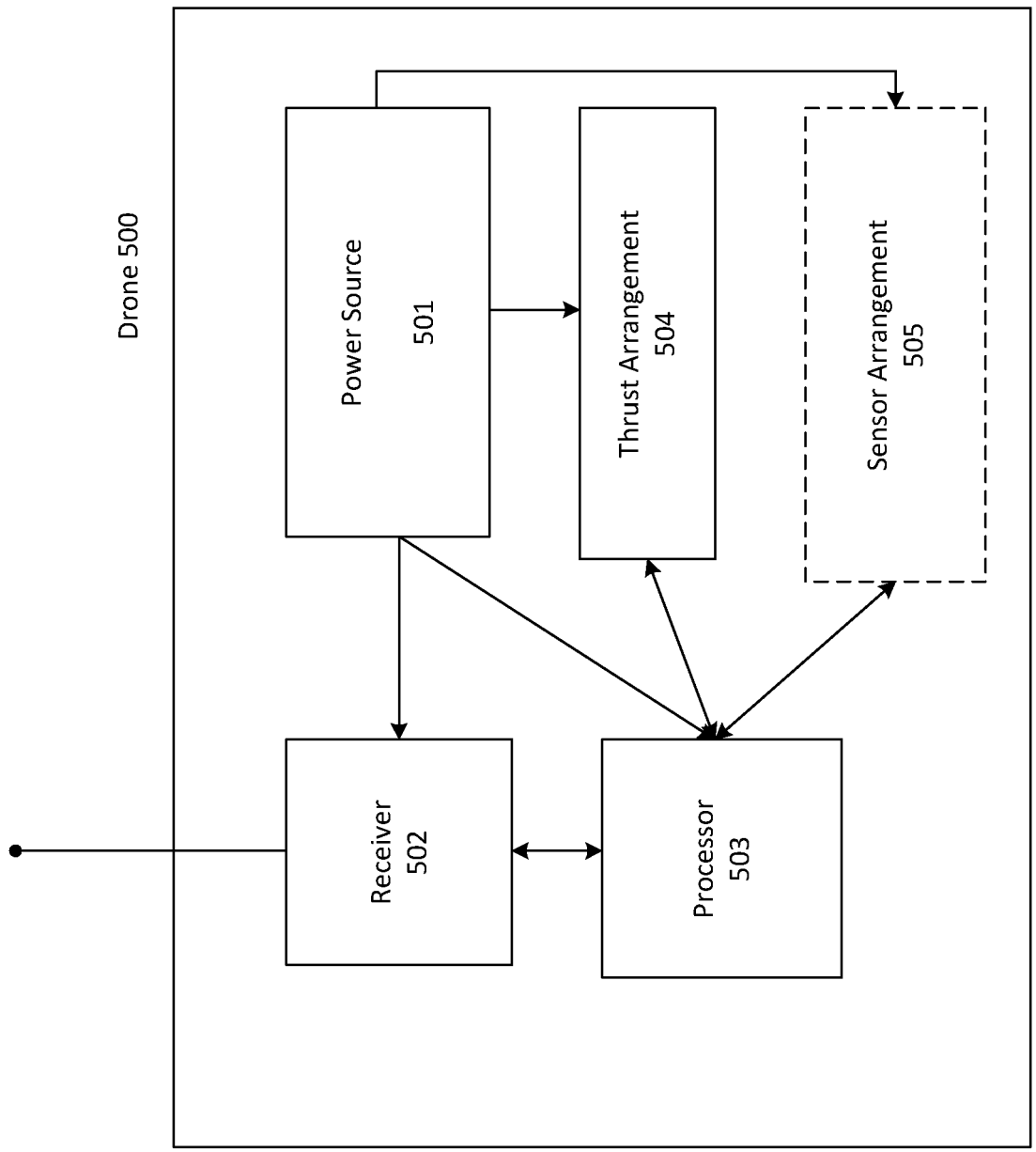
FIG. 5 is a conceptual representation of a drone or micro drone.

FIG. 5 includes a conceptual representation of a drone or micro drone according to the present design. From FIG. 5, drone 500 may include a power source 501, a receiver 502, a processor 503, a thrust arrangement 504 including at least one thrust mechanism, and a sensor arrangement 505, which may include one or more sensors. In one aspect, the sensor may be a camera or video device that may be lightweight enough to be supported by the thrust arrangement 504 of drone 500, and may include a transmitter or a storage device configured to transmit or store video data, respectively. In one arrangement, the sensor arrangement comprising a camera or video recording device may interface with processor 503 or an alternate processor to determine the presence of a desired item, such as a person, a reference point, or other visual cue. Other forms of sensor may be provided, including an audio sensor, or a simple senor that senses light or temperature or some other physical attribute and/or phenomenon. Multiple sensors may be provided with the drone, including but not limited to a video sensor and an audio sensor, or in some situations two or more cameras or video sensors with one drone. In some arrangements one or more sensors may be provided with a drone while no sensors or fewer sensors are provided with an accompanying drone. Any combination of sensors and drones may be provided, and certain drones or micro drones may include no sensors or sensor arrangement.

In the case where the sensor arrangement of at least one drone or micro drone comprises a camera or video sensing device, the drone may be provided with a transmitter that transmits the video information to the controller or another device where the images may be viewed by a user or other person. Transmission in either direction, from controller to drone or drone to controller, may be by any practical means, including but not limited to RF (radio frequency), Bluetooth, WiFi, microwave, cellular, or other appropriate communication medium.

The drone or micro drone arrangement may again be provided with a hydrogen or helium filled balloon having varying sizes. The micro drone may be constructed of a lightweight material in its frame or exterior, such as of an aerogel graphene material or other lightweight material. The drone or micro drone may employ a solar cell for recharging purposes to increase hovering or lift time, and the solar cell may feed a small battery, with both the solar cell and the battery of a lightweight construction. The drone or micro drone may employ a lithium rechargeable battery or batteries. Any type of thrust mechanism may be employed that is practical, from propellers to miniature jet type engines, to air being let out of a pressurized vessel such as a balloon, to a pressurized bladder or canister. The apparatus may be fitted with a digital or mechanical gyroscope, altimeter, and/or accelerometer to determine pitch, roll, yaw, elevation, and motion (speed, acceleration, etc.)

Figure 6A:
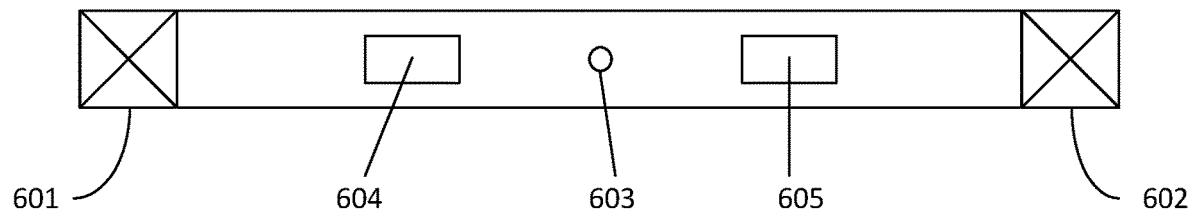
FIG. 6A illustrates a top view of an alternate embodiment of the current design.

FIG. 6A illustrates a top view of an alternate embodiment of the current design. Element 601 represents a first top drone, element 602 a second top drone, element 603 a pressure release valve, and elements 604 and 605 rechargeable lithium batteries connected to the drones 601 and 602. FIG. 6A may, in one embodiment, represent a bottom view of the device in addition to a top view, where element 601 represents a first bottom drone, element 602 a second bottom drone, with a lower release valve and two rechargeable lithium batteries provided. Rechargeable lithium batteries are optional and drones may include power sources, and some but not all of the drones may be powered by external power sources.

Figure 6B:
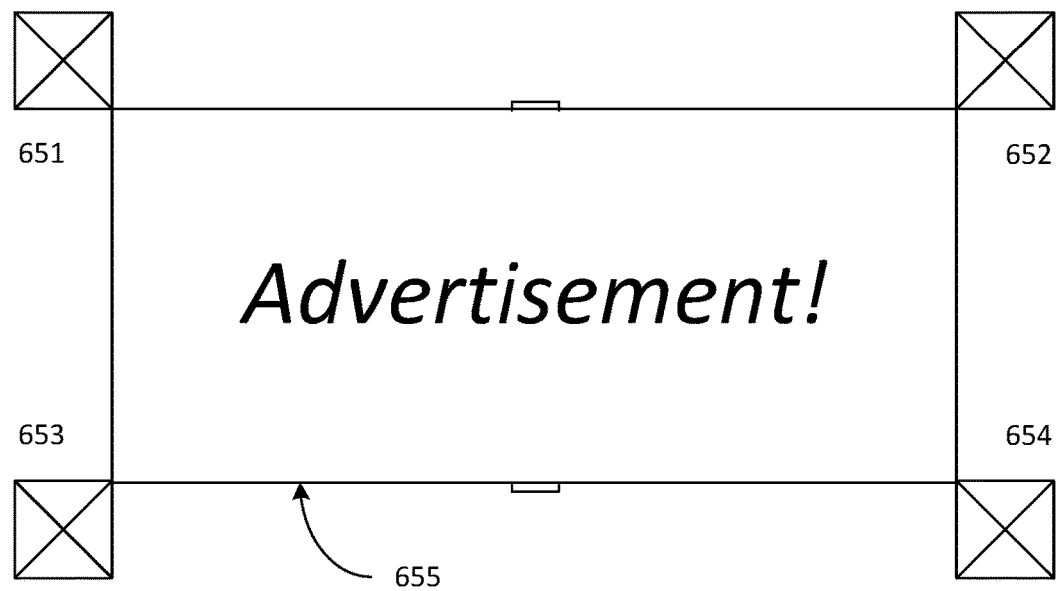
FIG. 6B represents a front view of the design and may also represent a rear view of the design in one embodiment.
Figure 6C:
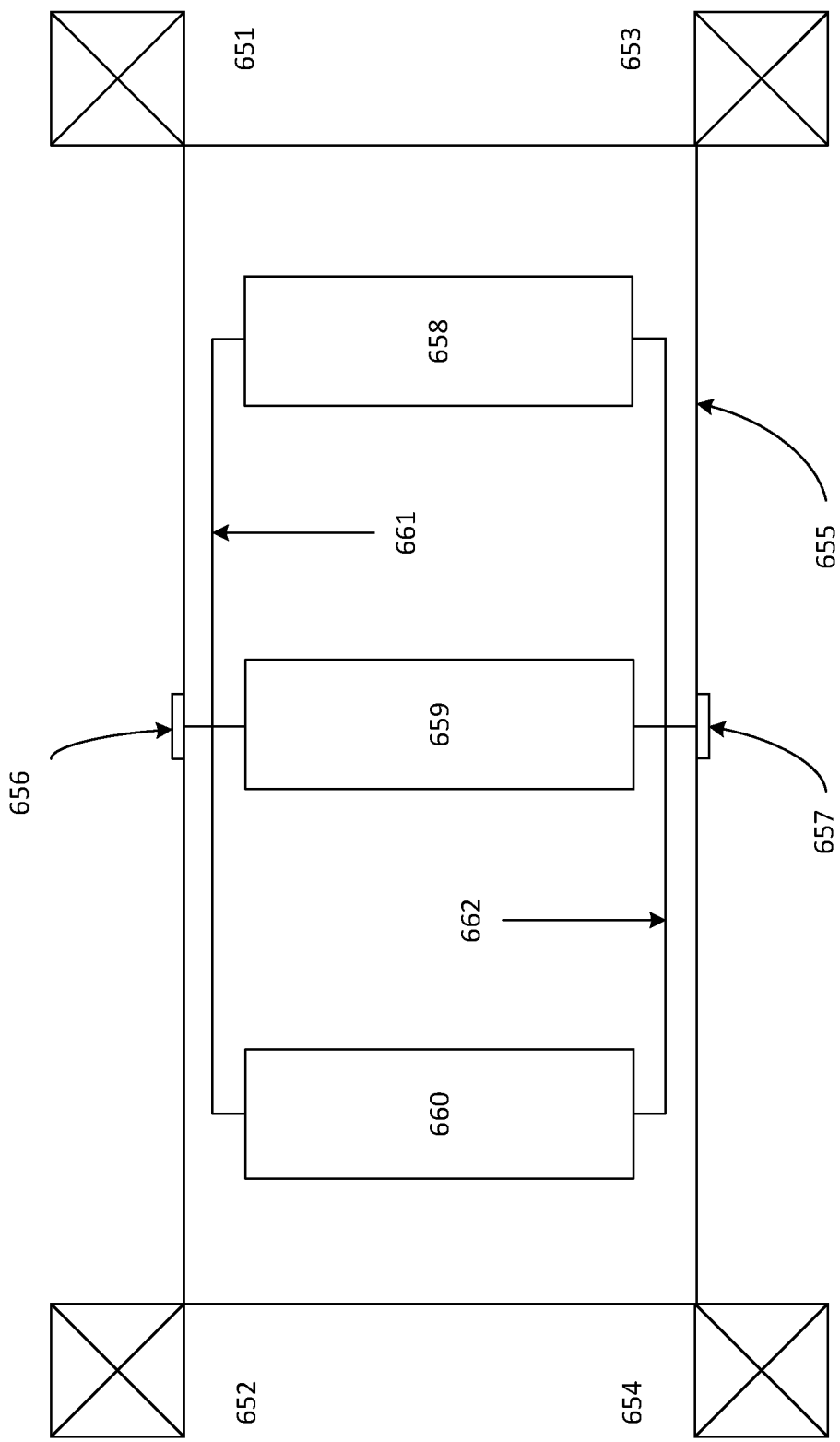
FIG. 6C illustrates either a back view of the arrangement or a cross section of the design.

FIG. 6B represents a front view of the design and may also represent a rear view of the design in one embodiment. Four drones 651, 652, 653, and 654 are provided with a surface 655 where surface 655 could be provided with any graphic material or possibility of projection of an image thereon. While the drones 651-654 are shown as relatively fixedly mounted to the surface 655, a loose connection, such as by a hook and loop or other connection means may be provided, together with connections to the rechargeable lithium batteries. FIG. 6C illustrates either a back view of the arrangement or a cross section of the design, showing drones 651-654, valves 656 and 657, and in this arrangement, three fluid sources 658, 659, and 660. The three fluid sources 658, 659, and 660 are electronically controlled by a separate processor (not shown) to expel fluid upward through lines 661 or downward through lines 662 to one of valves 656 and 657 at desired times. Control of the three fluid sources 658, 659, and 660 via this processor may be provided remotely, i.e. via a remote control also used to control the drone arrangement. Control may be provided as an "upward thrust" or "downward thrust" switch arrangement or similar control setup. An "upward thrust" command may cause the processor to effectuate one or more of the three fluid sources 658, 659, and 660 through lines 662 to valve 657, causing the arrangement to move upward. Control may be binary (on/off), or gradual (series of set points or linear based on signals received). Again, FIG. 6C may include components that are bounded or bordered by two surfaces, or the components may be positioned behind one surface and exposed on one side.

Figure 7A:
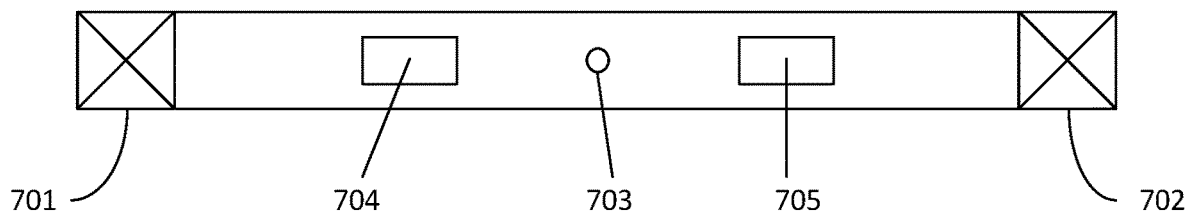
FIG. 7A is a top view of an alternate embodiment comprising two drones or micro drones.
Figure 7B:
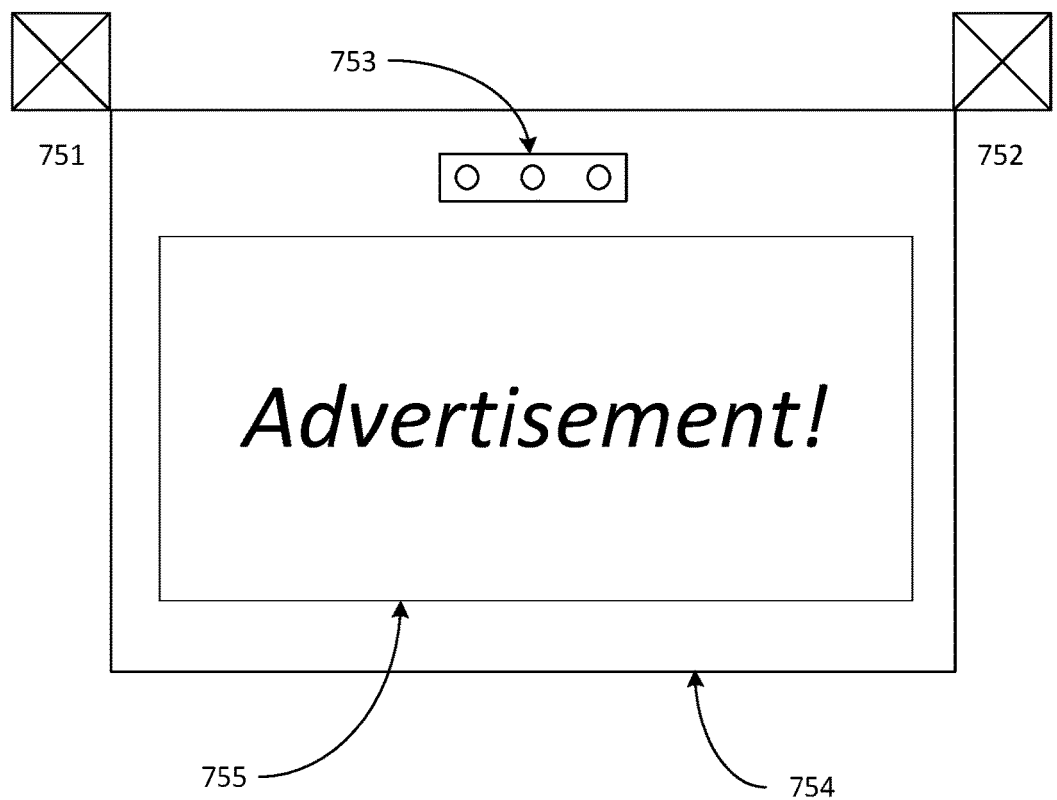
FIG. 7B illustrates a front view of a dual drone or micro drone design.

FIG. 7A is a top view of an alternate embodiment comprising two drones or micro drones, again showing first top drone 701, second top drone 702, valve 703, and two rechargeable lithium batteries 704 and 705. FIG. 7B is a front view of a dual drone or micro drone design, with first top drone 751, second top drone 752, and an infrared sensor 753 positioned on or in a surface 754. Graphic material or a space to display or project graphic material is provided as space 755. The IR sensor 753 can be provided with connections to the drones 751 or 752 for control of the drones or can sense information that is then processed and displayed in space 755. The IR sensor may alternately sense signals (IR signals) that indicate a step or action has been completed and a next step should commence. For example, if the drone apparatus has achieved position A, a remote device may transmit a signal to IR sensor 753 and IR sensor 753 may convey this to the processor, which may realize that upon achieving position A, the arrangement should now move to position B, such as along or generally in accordance with a predetermined path.

Figure 8A:
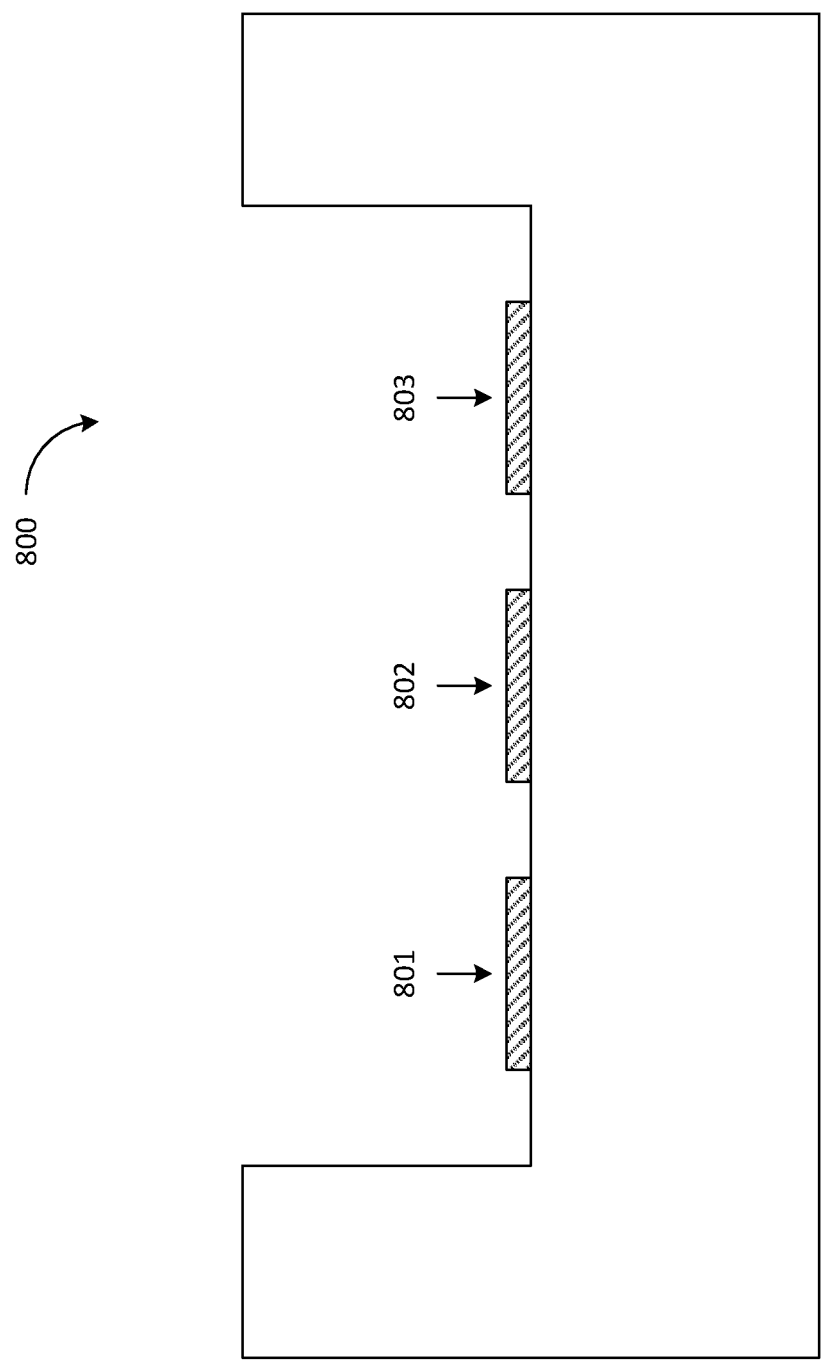
FIG. 8A is a side view of a sample charging station that is configured to receive and recharge rechargeable batteries.
Figure 8B:
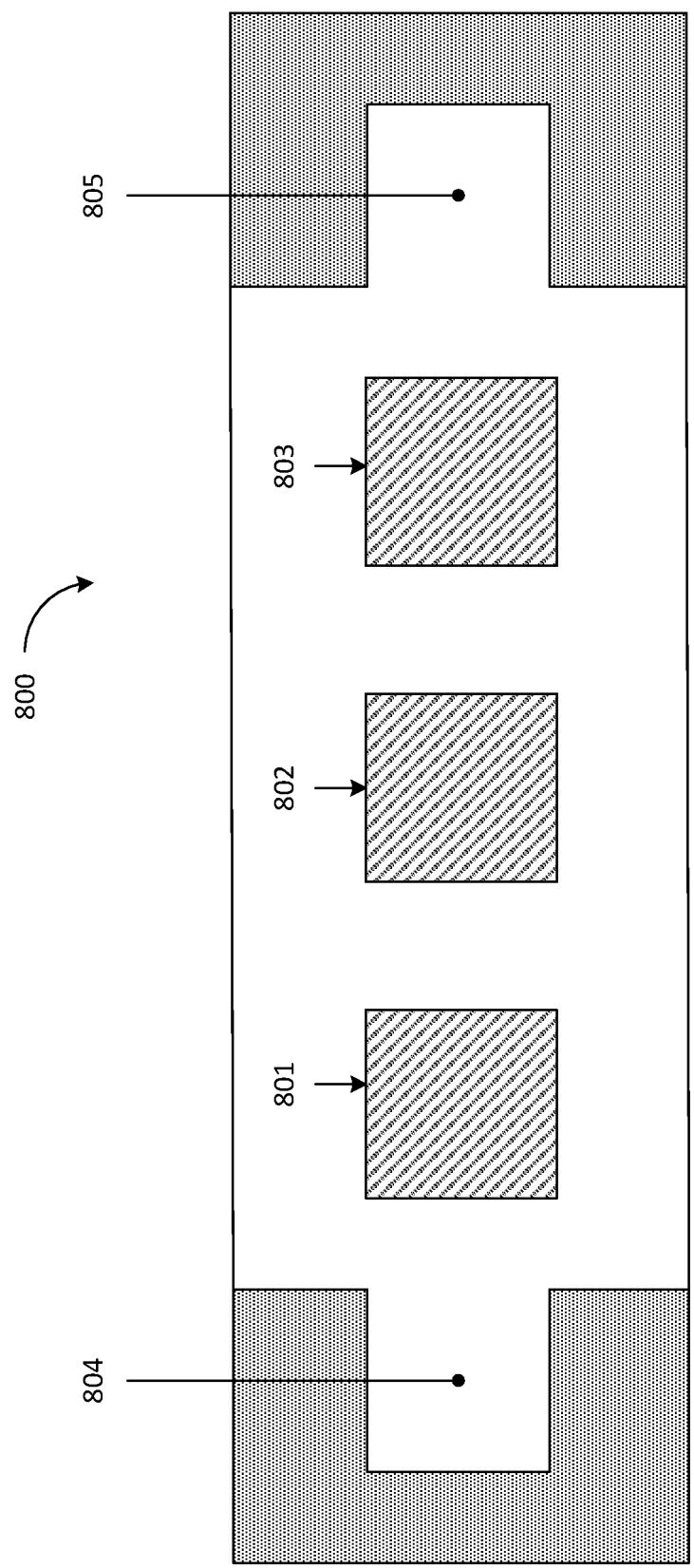
FIG. 8B represents a top view of the charging station design.

FIG. 8A is a side view of a sample charging station 800 that is configured to receive and recharge rechargeable batteries. Pads 801, 802, and 803 receive the rechargeable batteries, possibly using an arrangement similar to the design shown in FIG. 6A, where the receiving batteries are placed in contact with or proximate pads 801, 802, and 803, or at least one of the pads. FIG. 8B is a top view of the charging station design, with pads 801, 802, and 803 shown and openings 804 and 805 presented to receive hardware similar to the design presented in FIG. 6A.

As may be appreciated, rechargeable batteries are known, and recharging of such batteries may be accomplished by an exposed surface meeting with another exposed surface, and lithium ions travel from the charging station to the battery cell being charged, and in the case of lithium-ion batteries, from a positive electrode to a negative electrode through an electrolyte. Such rechargeable lithium ion batteries should be lightweight and allow for a relatively lengthy period of drone/micro drone operating time.

While not shown in the present drawings, the present design may include solar cells as primary or supplementary power sources. Such solar cells may be provided with the drone or micro drone or with elements attached to the drone or micro drone that powers the drone or micro drone.

The present design as noted may include sensors, including a camera or cameras, an audio sensor or sensors, and/or other sensing devices. When the drone arrangement is moving, it may be visually sensing its surroundings, including sensing reference materials, such as reflective bands or reflective item, for example an aluminum impregnated marker. Once these markers have been sensed, the device may transition to a next position, or alternately, the device may sense certain movement, such as movement of a person having a reflective item on his or her body, and may be employed to sense speed of running or even parameters such as difference between desired movement and actual movement, e.g. the user is employing his arms too much while running Applications The present design may be employed in a variety of applications, including advertisement. When used for advertisement or promotion, the present design may be deployed indoors or outdoors, such as in an indoor mall where a business or party can advertise regarding specials or discounts or simply to gather attention. The present design may also carry items, including samples or even items such as smartphones and may communicate with a vendor, such as seeking item availability information. A projection device may be provided that projects information onto the surface of the drone arrangement, such as availability of a certain item sold by a vendor. Alternately, projection may be provided by the drone arrangement, with projection of an image using lenses or other magnification devices onto the surface, or using an ultra-thin and ultra-light projection surface, such as an OLED surface.

The device may be used for gymnastic or fitness purposes, such as when running. The device may be at approximately eye level, following the user and facilitating analysis of the activity (time, correct form, etc.) and potentially providing hands free interaction with a smartphone, i.e. by receiving audio commands and possibly visual commands and allowing for smartphone operation. In this instance, the phone may be provided on the drone apparatus or may be separately provided with a Bluetooth connection to the drone apparatus. A speaker may be provided with the drone apparatus if the smartphone is provided separately. The device may be deployed in a workout environment and may follow the user and be used in analyzing the exercise routine using the aforementioned camera(s) and other sensor(s).

The arrangement may additionally provide for an extended view, i.e. a panoramic view and may be used to facilitate recording of certain events as desired. The arrangement may be used for military or police applications, where the arrangement is relatively small and can be easily deployed for surveillance, electronic interference, target tagging, and other applicable uses. The arrangement can be used for surveillance, where initiated by a sensor that is a motion detector, the drone arrangement can be deployed to investigate, assess, and respond to various scenarios. In the hospitality industry, the arrangement can be used to greet customers and take orders, and if aerodynamically feasible, deliver items to customers. The arrangement can also be used for educational purposes, traveling to desired locations and facilitating video conferencing and interactions from school locations. The device may be used for shading, where a lightweight surface is maintained between multiple, such as four, drones or micro drones, forming a shade or awning that can shield users or prevent filming of an act or item or event.

In operation, the drone arrangement may focus on a target, such as a head or face of a subject individual, or on a particular piece or device (e.g. aluminum impregnated plastic), or may employ GPS functionality to determine existing position and target position. The drone arrangement may be employed in a predetermined course, i.e. going around in a predetermined circle, or a square, or rectangle, or other desired shape. The drone arrangement may seek to attain established wall or floor grounded relay stations, or may seek to follow a series of markers, such as aluminum impregnated plastic markers disposed at different locations over the course, viewable by at least one visual sensor provided with the drone arrangement. Thus the device may employ active or passive guidance, where active guidance employs sensors and seeks to find certain desired points, or passive guidance where the device simply attempts to follow or substantially achieve a predetermined course, possibly using a sensor or sensor provided with the drone arrangement. The drone arrangement may be triggered if motion is sensed, e.g. motion of a nearby person, or via detection of a signal, such as an infrared or RF signal or otherwise, and such a signal can result in the drone arrangement moving to a desired location and potentially providing images and/or audio.

The drone arrangement may be operator dependent in that, in a mall situation, a control room is provided with an operator or operators that can command position of the drone arrangement and can potentially change the graphical information provided to or on the drone arrangement. As an example, if a person or persons fits a particular demographic and the operators determine a particular advertisement would be of interest to the person or persons, such an advertisement may be provided on or with the drone arrangement. The drone arrangement may receive and may process voice commands, either at or using processing provided with the drone arrangement, or at a control or other remote device that transmits relevant commands or information to the drone arrangement. Simple or complex voice commands may be provided.

Figure 9:
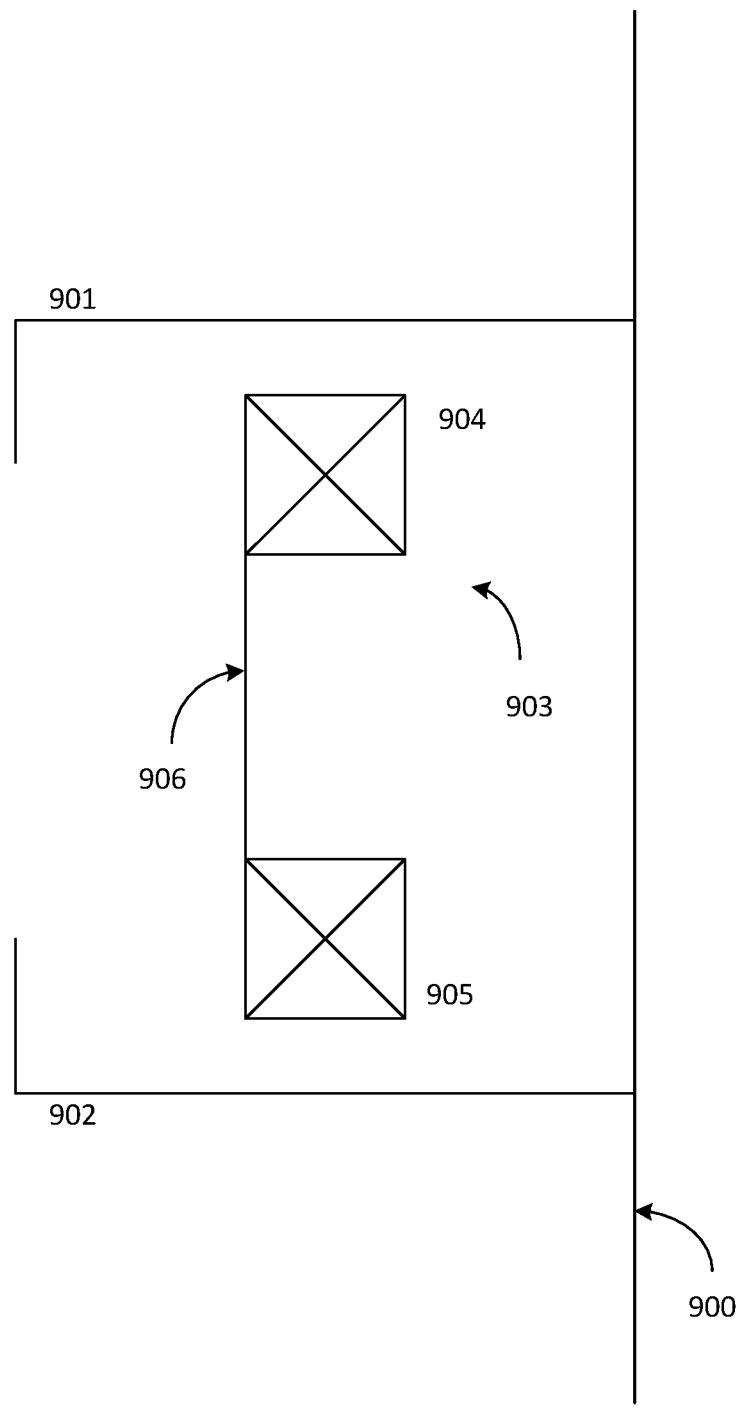
FIG. 9 is a cross section of a guide used to enclose the device.

A guide may be provided, such as adjacent or affixed to a wall, as shown in FIG. 9. Upper housing 901 and lower housing 902 is provided, and drone arrangement 903, including drones 904 and 905 as well as surface 906, are provided. Two drones are not shown in this view. The arrangement of FIG. 9 may be provided, for example, along a length of a wall, with FIG. 9 representing a cross section of the wall arrangement. The drone arrangement may optically use the upper housing 901 and lower housing 902 as references, and drones 904 and 905 to guide the drone arrangement along the length. Such an arrangement may reduce the possibility of stray airflow, i.e. wind gusts, and the arrangement may be provided with a clear cover in front of surface 906, such as adjoined to upper housing 901 and lower housing 902. Alternately, a guide may be provided on one or more of the individual drone or micro drones, where the guide may be a "whisker" or "feather" or simply an extension of some type on the drone with a sensor configured to sense when the extension contacts the upper or lower housing or the wall. In such an instance, contact by the extension with one of the surrounding surfaces will trigger the drone to guide away from the surface contacted using processing provided. In general, each drone will be responsible for its own control in this arrangement, and the drone arrangement may simply travel up and down the length of the channel so formed. The drones may realize when they have reached an end of the channel using touch sensing or visual cue sensing, i.e. receiving video images of reference materials.

Figure 10:
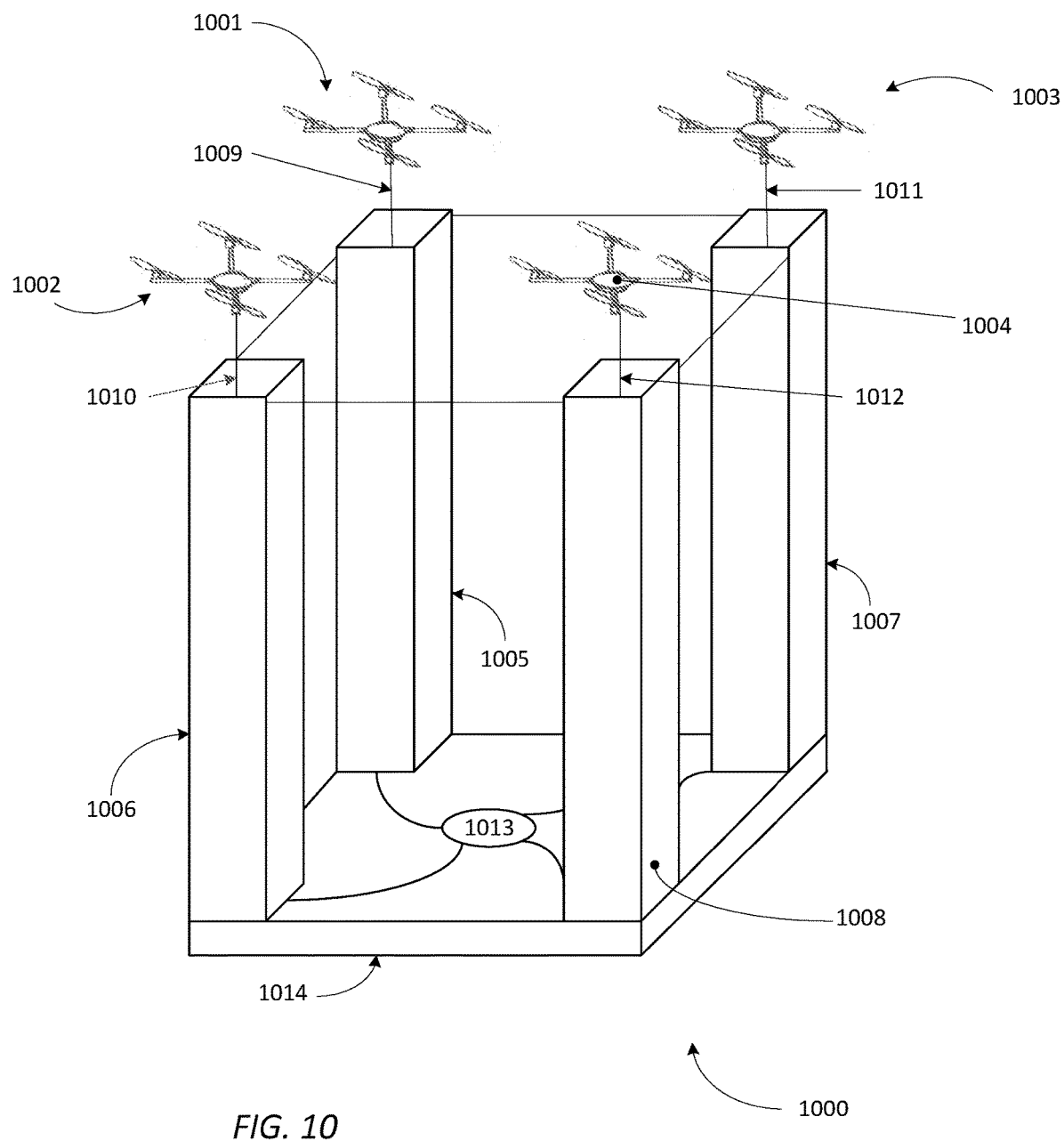
FIG. 10 illustrates an alternate drone arrangement embodiment.

FIG. 10 includes an alternate drone arrangement 1000 including four drones 1001-1004 collectively held together using relatively stiff connections, such as plastic, or loose connections, such as a string or wire, with four posts 1005-1008 provided, with connections 1009-1012 provided from each individual drone through each post to a rechargeable lithium ion battery or battery arrangement 1013 together with a processor and possibly a receiver. A bottom surface 1014 may be provided, and the drone arrangement 1000 offers four potential surfaces for advertising and/or projection.

Figure 11A:
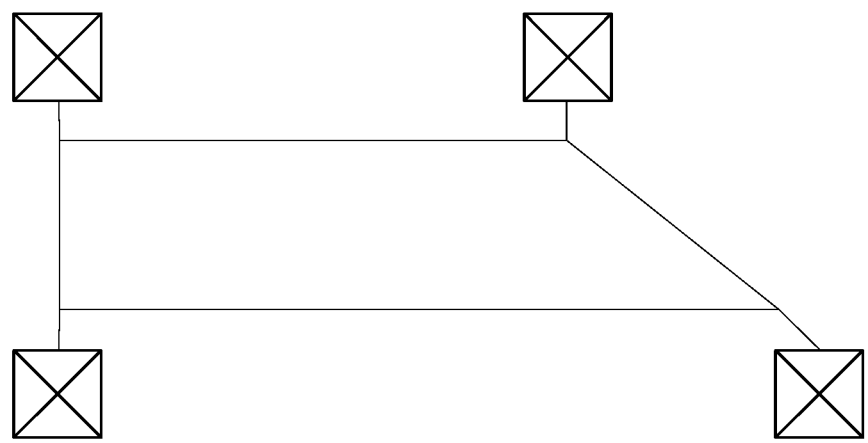
FIGS. 11A-11C show examples of off-center drone arrangements with loose connections to the surface.
Figure 11B:
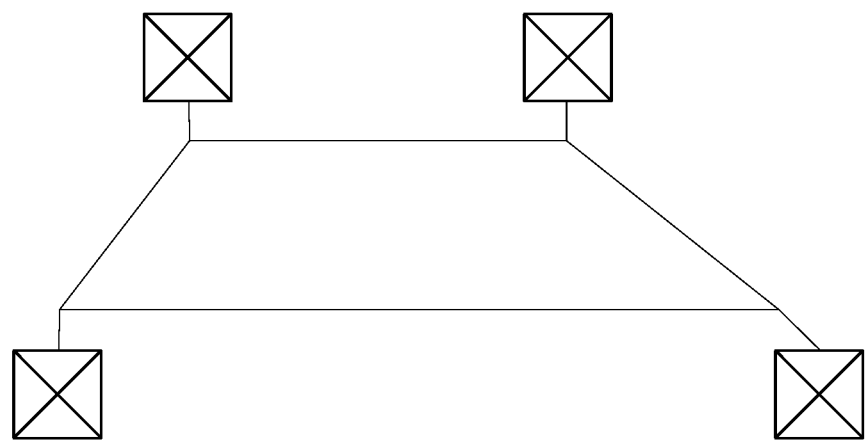
Figure 11C:
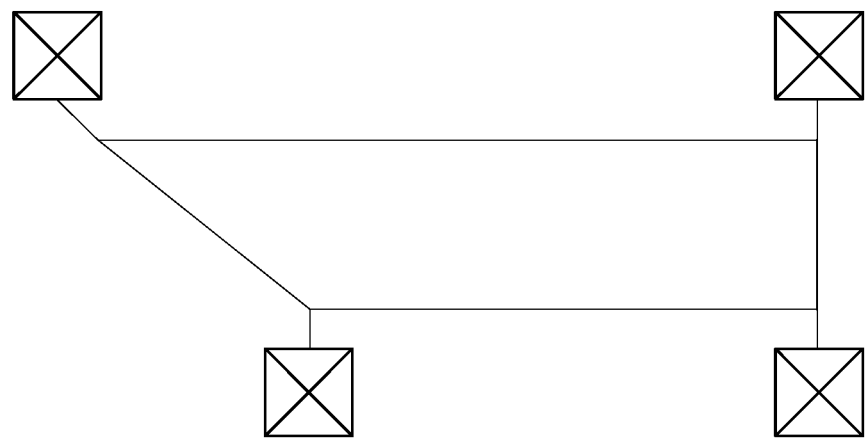

In certain instances, a tether may be provided with or from the drone arrangement. The tether may be retractable or configured to tighten a connection between the drone and a remote element, such as a remote person or reference point. Further, the present drone arrangement may provide off-centered or non-regular placement of drones to potentially lessen stress on the surface. A few examples of off-center drone arrangements, with loose connections to the surface, are shown in FIGS. 11A-11C.

In one embodiment, the drone arrangement may be provided with a contact, such as an arm emanating from and connected to a wall, controlled to move the drone arrangement along, typically horizontally, to a subsequent arm or position. The arm may be a simple pivot or hinge mechanism and may include, for example, a magnetic element that can be turned on and off with the drone arrangement comprising a corresponding magnetic element, such as on a surface of the drone arrangement described herein. Such movement using an arm is controlled to be gradual enough to enable stable movement of the drone arrangement with little risk of instability.

Additionally, the design may include a "heating coil" to heat up the air like in a hot air balloon. Such a coil may be provided with the thrusters (propellers or other drive mechanism) and/or the main balloon. The coil temperature is controlled by the controller and may be remotely commanded. A small and lightweight heating coil may be provided, such as coils used for vaping.

Thus according to one embodiment, there is provided an apparatus comprising a plurality of drone devices, each drone device comprising an unmanned vehicle configured to be controlled to hover in air at a desired height and move to a desired location, each drone device comprising a rechargeable battery connected to an exposed drone recharging surface, and a surface apparatus connected to the plurality of drone devices such that the plurality of drone devices are collectively controllable to reposition the surface apparatus to a desired location. Each drone device is configured to connect to and recharge at a compatible charging station comprising an exposed recharging station recharging surface configured to meet with one exposed drone recharging surface to recharge the rechargeable battery.

According to another embodiment, there is provided a drone device arrangement comprising at least one drone device comprising an unmanned vehicle configured to be controlled to hover in air at a desired height and move to a desired location, with at least one drone device comprising a rechargeable battery connected to an exposed drone recharging surface, and a surface apparatus configured to contain a fluid that is lighter than air, the display surface connected to the at least one drone device. Each drone device is configured to connect to and recharge at a compatible charging station comprising an exposed recharging station recharging surface configured to meet with one exposed drone recharging surface to recharge the rechargeable battery.

According to a further embodiment, there is provided a rechargeable drone arrangement comprising a plurality of drone devices configured to be controlled to hover in air at a desired height and move to a desired location, and a surface apparatus comprising graphical information and a lighter than air fluid, the surface apparatus connected to the plurality of drone devices such that the plurality of drone devices are collectively controllable to reposition the surface apparatus to a desired location. Each drone device comprises an exposed drone recharging surface configured to receive charge and recharge a drone rechargeable battery in one drone device, wherein each drone device is configured to recharge at a compatible charging station comprising an exposed recharging station recharging surface that meets with one exposed drone recharging surface to recharge one drone rechargeable battery.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. An apparatus, comprising:
   a plurality of drone devices, each drone device comprising an unmanned vehicle configured to be controlled to hover in air at a desired height and move to a desired location, each drone device comprising a rechargeable battery connected to an exposed drone recharging surface;
   a surface apparatus connected to the plurality of drone devices such that the plurality of drone devices is collectively controllable to reposition the surface apparatus to a desired location; and
   a compatible multiple station charging station formed to receive the plurality of drone devices joined together by the surface apparatus and comprising a plurality of exposed recharging station recharging surfaces configured to receive the plurality of drone devices joined together by the surface apparatus and meet with a plurality of exposed drone recharging surfaces to recharge multiple rechargeable batteries in the plurality of drone devices.

2. The apparatus of claim 1, wherein the compatible charging station comprises a recharging battery source that is solar powered.

3. The apparatus of claim 1, wherein the surface apparatus comprises a container comprising a fluid lighter than air.

4. The apparatus of claim 3, wherein the surface apparatus further comprises graphic material.

5. The apparatus of claim 1, wherein the plurality of drone devices comprise at least one drone device positioned above the surface apparatus and at least one drone device positioned below the surface apparatus.

6. The apparatus of claim 1, wherein the plurality of drone devices comprise at least two drone device positioned above the surface apparatus and an absence of drone devices positioned below the surface apparatus.

7. The apparatus of claim 1, further comprising a plurality of electrically controlled fluid sources.

8. The apparatus of claim 1, wherein the plurality of drone devices is connected to a rechargeable battery source when in flight.

9. A drone device arrangement comprising:
- a plurality of drone devices comprising an unmanned vehicle configured to be controlled to hover in air at a desired height and move to a desired location, with at least one drone device comprising a rechargeable battery connected to an exposed drone recharging surface;
- a surface apparatus configured to contain a fluid that is lighter than air, the display surface connected to the at least one drone device; and
- a compatible multiple station charging station formed to receive the plurality of drone devices joined together by the surface apparatus and comprising a plurality of exposed recharging station recharging surfaces configured to receive the plurality of drone devices joined together by the surface apparatus and meet with a plurality of exposed drone recharging surfaces to recharge multiple rechargeable batteries in the plurality of drone devices.

10. The drone device arrangement of claim 9, wherein the at least one drone device comprises two drone devices positioned above the surface apparatus.

11. The drone device arrangement of claim 9, wherein the at least one drone device comprises at least one drone device positioned above the surface apparatus and at least one drone device positioned below the surface apparatus.

12. The drone device arrangement of claim 9, wherein the surface apparatus comprises graphic material.

13. The drone device arrangement of claim 9, wherein at least one drone device comprises a sensor arrangement.

14. The drone device arrangement of claim 13, wherein the sensor arrangement comprises a camera or a video recording device.

15. A rechargeable drone arrangement, comprising:
- a plurality of drone devices configured to be controlled to hover in air at a desired height and move to a desired location;
- a surface apparatus comprising graphical information and a lighter than air fluid, the surface apparatus connected to the plurality of drone devices such that the plurality of drone devices is collectively controllable to reposition the surface apparatus to a desired location; and
- a compatible multiple station charging station formed and configured to receive the plurality of drone devices joined together by the surface apparatus, the compatible multiple station charging station comprising multiple recharging station recharging surfaces each arranged to connect with one exposed drone recharging surface to recharge one drone rechargeable battery;
- wherein each drone device comprises an exposed drone recharging surface configured to receive charge and recharge a drone rechargeable battery in one drone device, wherein each drone device is configured to recharge at the compatible multiple station charging station.

16. The rechargeable drone arrangement of claim 15, wherein the plurality of drone devices comprise at least one drone device positioned above the surface apparatus and at least one drone device positioned below the surface apparatus.

17. The rechargeable drone arrangement of claim 15, wherein the plurality of drone devices comprise at least two drone devices positioned above the surface apparatus and an absence of drone devices positioned below the surface apparatus.

18. The rechargeable drone arrangement of claim 15, wherein at least one drone device comprises a sensor arrangement.

19. The rechargeable drone arrangement of claim 18, wherein the sensor arrangement comprises a camera or a video recording device.

* * * * *